United States Patent
Shin et al.

(10) Patent No.: US 11,611,125 B2
(45) Date of Patent: Mar. 21, 2023

(54) BATTERY MODULE HOUSING HAVING EASILY REUSABLE, RECYCLABLE, AND REWORKABLE ADHESION STRUCTURE AND BATTERY MODULE COMPRISING SAME

(71) Applicant: LG Chem, Ltd., Seoul (KR)

(72) Inventors: Eun-Gyu Shin, Daejeon (KR); Dal-Mo Kang, Daejeon (KR); Jeong-O Mun, Daejeon (KR); Yoon-Koo Lee, Daejeon (KR)

(73) Assignee: LG Energy Solution, Ltd.

( * ) Notice: Subject to any disclaimer, the term of this patent is extended or adjusted under 35 U.S.C. 154(b) by 20 days.

(21) Appl. No.: 16/625,453

(22) PCT Filed: Dec. 14, 2018

(86) PCT No.: PCT/KR2018/015956
§ 371 (c)(1),
(2) Date: Dec. 20, 2019

(87) PCT Pub. No.: WO2019/143029
PCT Pub. Date: Jul. 25, 2019

(65) Prior Publication Data
US 2020/0411815 A1    Dec. 31, 2020

(30) Foreign Application Priority Data

Jan. 17, 2018  (KR) .................. 10-2018-0005922

(51) Int. Cl.
*H01M 50/20*   (2021.01)
*H01M 10/653*  (2014.01)
(Continued)

(52) U.S. Cl.
CPC .......... *H01M 50/20* (2021.01); *H01M 10/42* (2013.01); *H01M 10/4207* (2013.01);
(Continued)

(58) Field of Classification Search
None
See application file for complete search history.

(56) References Cited

U.S. PATENT DOCUMENTS

| 4,464,008 A | * | 8/1984 | Andersson ........... H01R 11/281 |
|---|---|---|---|
| | | | 439/388 |
| 2003/0006626 A1 | * | 1/2003 | Tamura .................. B60J 1/1815 |
| | | | 296/146.14 |

(Continued)

FOREIGN PATENT DOCUMENTS

| CN | 107579178 A | 1/2018 |
|---|---|---|
| CN | 207449607 U | 6/2018 |

(Continued)

OTHER PUBLICATIONS

Extended European Search Report for Application No. 18901341.0 dated Oct. 5, 2020, 6 pages.

(Continued)

*Primary Examiner* — Ula C Ruddock
*Assistant Examiner* — Mary Grace Byram
(74) *Attorney, Agent, or Firm* — Lerner, David, Littenberg, Krumholz & Mentlik, LLP (57) ABSTRACT

A battery module housing includes a top plate and a bottom plate forming an upper wall and a lower wall, respectively, and a first side plate and a second side plate forming side walls, respectively, the battery module housing having a rectangular tube shape provided to accommodate battery cells in an inner space thereof, wherein the battery module housing has four bonding portions each including an adhesive along a longitudinal direction, the bonding portions located at two sites between opposing side edges of the top plate and top surfaces of the first side plate and second side plate, respectively, and at two sites between opposing side (Continued)

edges of the bottom plate and bottom surfaces of the first side plate and second side plate, respectively.

5 Claims, 11 Drawing Sheets

(51) Int. Cl.
    *H01M 10/6551* (2014.01)
    *H01M 50/211* (2021.01)
    *H01M 50/293* (2021.01)
    *H01M 10/647* (2014.01)
    *H01M 10/42* (2006.01)
(52) U.S. Cl.
    CPC ....... *H01M 10/647* (2015.04); *H01M 10/653* (2015.04); *H01M 10/6551* (2015.04); *H01M 50/211* (2021.01); *H01M 50/293* (2021.01)

(56) References Cited

U.S. PATENT DOCUMENTS

| | | | | |
|---|---|---|---|---|
| 2006/0196875 | A1* | 9/2006 | Cherian | B65D 17/4012 220/269 |
| 2009/0184682 | A1* | 7/2009 | Kosugi | H01M 10/425 320/134 |
| 2011/0039134 | A1 | 2/2011 | Kim et al. | |
| 2015/0280193 | A1 | 10/2015 | Ohshiba et al. | |
| 2016/0105143 | A1* | 4/2016 | Johansen | H02S 20/25 248/237 |
| 2017/0033340 | A1* | 2/2017 | Oishi | H01M 50/20 |
| 2018/0138565 | A1 | 5/2018 | Lee et al. | |
| 2018/0175464 | A1* | 6/2018 | Kim | H01M 50/24 |
| 2018/0261898 | A1* | 9/2018 | Kellner | H01M 10/647 |
| 2018/0291237 | A1* | 10/2018 | Mitsuboshi | C09J 9/02 |
| 2018/0375068 | A1 | 12/2018 | Makabe et al. | |
| 2019/0148688 | A1* | 5/2019 | Kellner | H01M 50/20 429/185 |

FOREIGN PATENT DOCUMENTS

| | | | | |
|---|---|---|---|---|
| DE | 102017104709 A1 * | 9/2018 | ......... H01M 10/625 |
| JP | 2000208115 A | 7/2000 | |
| JP | 2000235846 A | 8/2000 | |
| JP | 2005056625 A | 3/2005 | |
| JP | 2005158308 A | 6/2005 | |
| JP | 2009283148 A | 12/2009 | |
| JP | 2014078470 A1 | 5/2014 | |
| JP | 2015149192 A | 8/2015 | |
| JP | 2017068972 A | 4/2017 | |
| KR | 20080025424 A | 3/2008 | |
| KR | 20110016821 A | 2/2011 | |
| KR | 20120064171 A | 6/2012 | |
| KR | 20170070624 A | 6/2017 | |
| KR | 20170107798 A | 9/2017 | |
| KR | 20170107800 A | 9/2017 | |
| WO | WO-2017013914 A1 * | 1/2017 | ................ C09J 7/20 |
| WO | 2017052296 A1 | 3/2017 | |
| WO | WO-2017052050 A1 * | 3/2017 | ........ H01M 10/6555 |
| WO | 2017115404 A1 | 7/2017 | |

OTHER PUBLICATIONS

International Search Report for Appln No. PCT/KR2018/015956 dated Mar. 18, 2019, 4 pages.

Search Report dated Dec. 10, 2021 from the Office Action for Chinese Application No. 201880051027.X dated Dec. 21, 2021, 3 pages.

* cited by examiner

BATTERY MODULE HOUSING HAVING EASILY REUSABLE, RECYCLABLE, AND REWORKABLE ADHESION STRUCTURE AND BATTERY MODULE COMPRISING SAME

CROSS-REFERENCE TO RELATED APPLICATIONS

The present application is a national phase entry under 35 U.S.C. § 371 of International Application No. PCT/KR2018/015956, filed Dec. 14, 2018, which claims priority to Korean Patent Application No. 10-2018-0005922 filed on Jan. 17, 2018 in the Republic of Korea, the disclosures of which are incorporated herein by reference.

TECHNICAL FIELD

The present disclosure relates to a battery module housing, and more particularly, to a battery module housing manufactured with a structure easy to reuse, recycle and rework, and a battery module including the battery module housing.

BACKGROUND ART

A battery module may include a plurality of battery cells stacked in one direction and having electrode leads electrically connected in series and/or in parallel, and a battery module housing for packaging the battery cells.

The battery module housing provides a mechanical support for the battery cells with insufficient mechanical stiffness and serves as a case for protecting the battery cells against external shocks. The battery module housing may be manufactured in various shapes depending on the battery module, and recently is frequently manufactured in a rectangular tube shape, which is referred to as a mono frame.

The conventional mono frame may be integrally manufactured by extrusion or die casting, or may be manufactured by joining four plates by welding.

However, if a problem occurs at an internal component of the battery module, for example battery cells or a thermistor interposed between the battery cells to measure the temperature of the cells, since the conventional battery module housing is integrally formed or manufactured by welding, the conventional battery module housing is not easily disassembled, and thus it is very difficult to repair or replace only the component with a problem.

Moreover, in the conventional battery module, if it is not possible to repair or replace the component with a problem due to the above structure of the battery module housing, the remaining components that are normally working may not be reused and should be entirely discarded.

Meanwhile, the battery module housing may also be manufactured by coupling four plates in a snap-fitting manner so that the battery module housing may be reworked. However, the snap-fitting method is not a satisfactory alternative because the coupling portion may be easily damaged even by a small impact and also the sealing property is relatively low compared with the integral-type or welding-type battery module housing. Thus, it is necessary to develop a battery module housing with a new structure which is easy to rework and has advantages of the integral type and the welding type.

DISCLOSURE

Technical Problem

The present disclosure is designed to solve the problems of the related art, and therefore the present disclosure is directed to providing a battery module housing, which has high airtightness and is easy to rework when necessary, and a battery module including the battery module housing.

However, the objects of the present disclosure are not limited to the above, and objects not mentioned herein may be clearly understood from the present specification by those skilled in the art.

Technical Solution

In one aspect of the present disclosure, there is provided a battery module housing, which includes a top plate and a bottom plate forming an upper wall and a lower wall, respectively, and a first side plate and a second side plate forming side walls, respectively, the battery module housing having a rectangular tube shape provided to accommodate battery cells in an inner space thereof, wherein the battery module housing has four bonding portions each including an adhesive along a longitudinal direction, the bonding portions located at two sites between opposing side edges of the top plate and top surfaces of the first side plate and second side plate, respectively, and at two sites between opposing side edges of the bottom plate and bottom surfaces of the first side plate and second side plate, respectively.

At least one of the bonding portions may have a detachable jig insertion space formed at a predetermined location, and the adhesive may not be applied to the detachable jig insertion space.

At least one of the bonding portions may have a plurality of detachable jig insertion spaces, and the plurality of detachable jig insertion spaces may be intermittently formed along the longitudinal direction of the first side plate or the second side plate.

At least one of the first side plate and the second side plate may have a space expansion portion defined by a concave region corresponding to the detachable jig insertion space.

The battery module housing may further comprise insulation pads respectively attached to inner surfaces of the top plate, the first side plate and the second side plate; and a thermal transfer pad attached to an inner surface of the bottom plate.

The battery module housing may further comprise a caulking member filled in the detachable jig insertion space.

At least one of the bonding portions may be inclined toward the inner space at a predetermined angle.

At least one of the top plate and the bottom plate may have bent portions bent from both edges thereof and disposed in contact with outer side surfaces of the first side plate and the second side plate.

In another aspect of the present disclosure, there is also provided a battery module, which comprises the battery module housing described above and one or more battery cells.

Advantageous Effects

According to an embodiment of the present disclosure, there is provided a battery module housing which is easy to rework, and thus if a problem occurs at an internal component of a battery module, it is possible to repair and replace the corresponding component and reuse the remaining components.

According to another embodiment of the present disclosure, the battery module housing is not only easy to rework but also gives airtightness as in the existing welding type.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
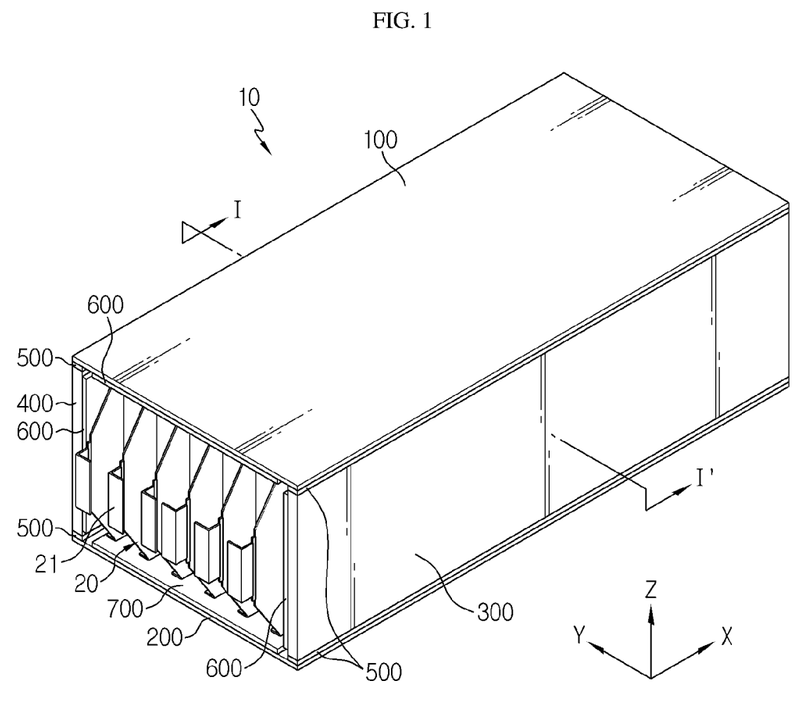
FIG. 1 is a perspective view schematically showing a battery module housing according to an embodiment of the present disclosure and battery cells accommodated therein.
Figure 2:
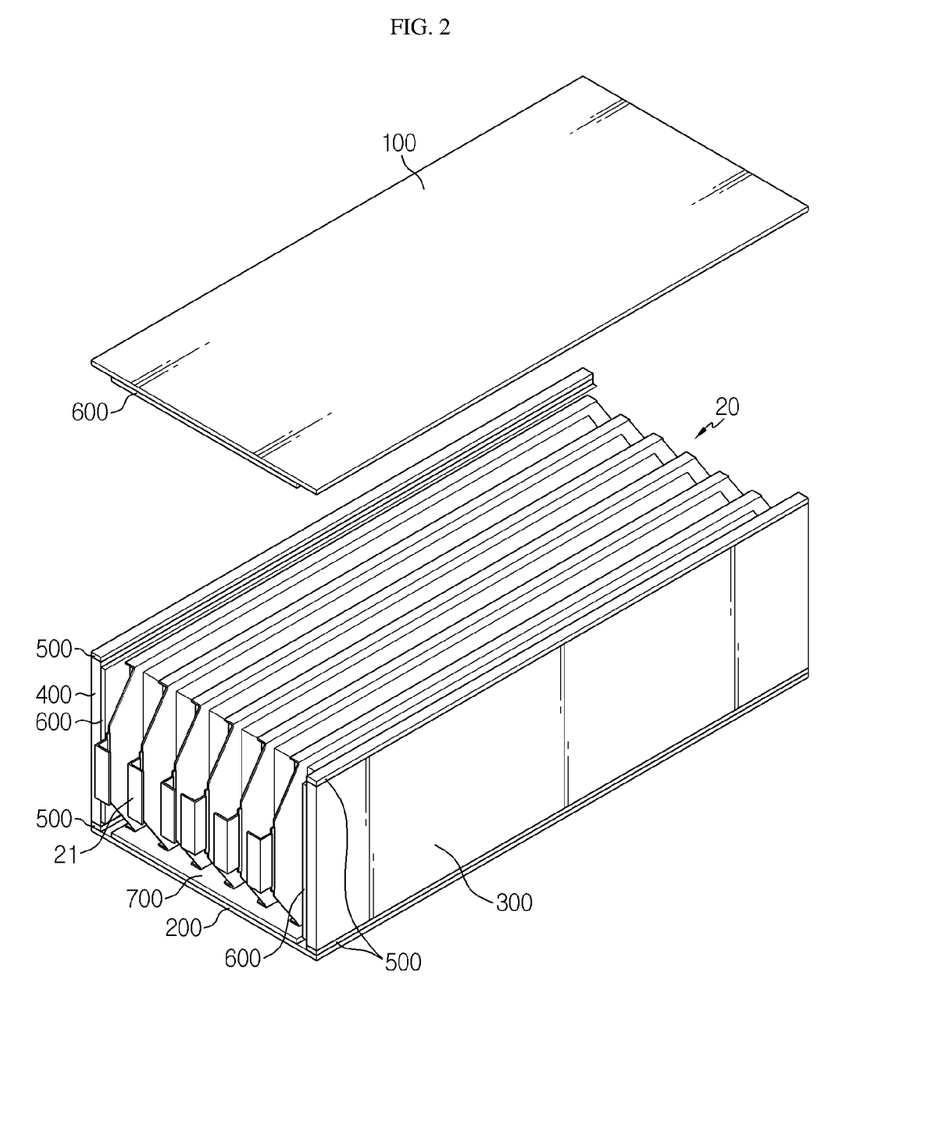
FIG. 2 is an exploded perspective view showing that a top plate is detached from the battery module housing of FIG. 1.
Figure 3:
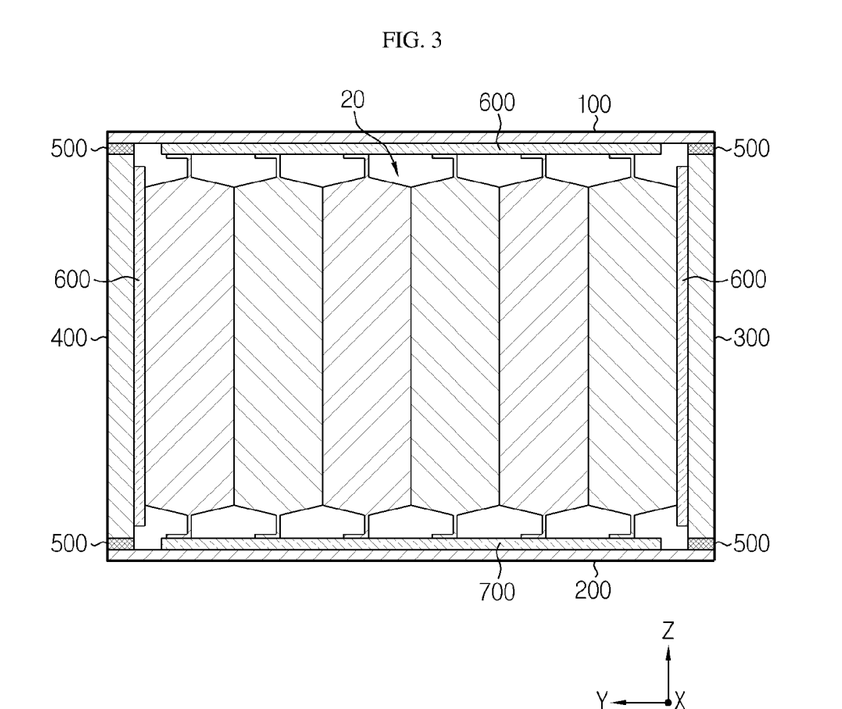
FIG. 3 is a schematic cross-sectioned view, taken along the line I-I' of FIG. 1.
Figure 4:
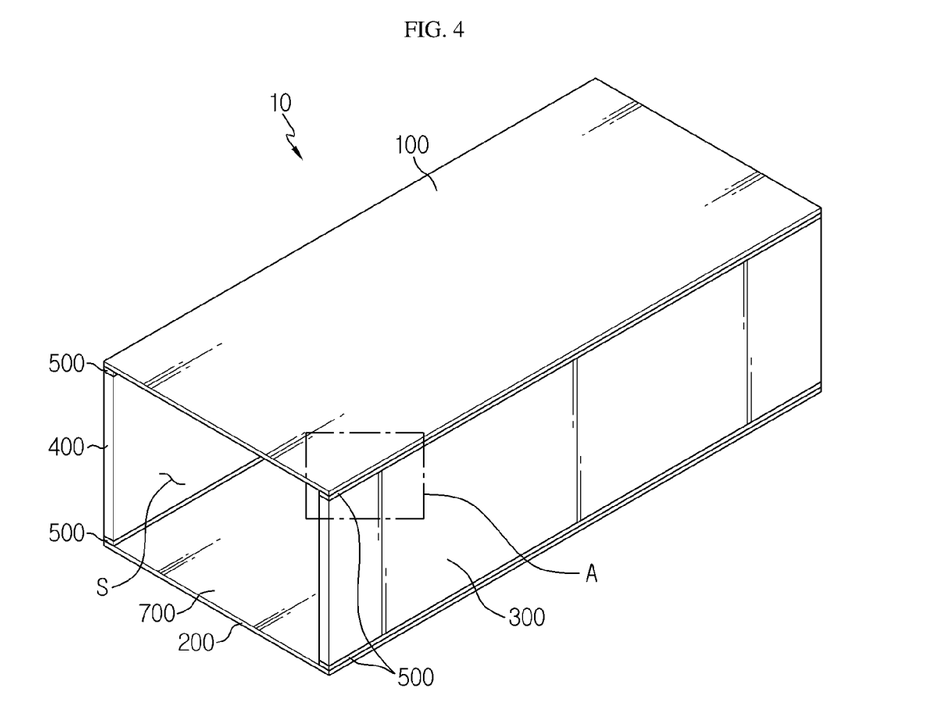
FIG. 4 is a perspective view showing the battery module housing according to an embodiment of the present disclosure.
Figure 5:
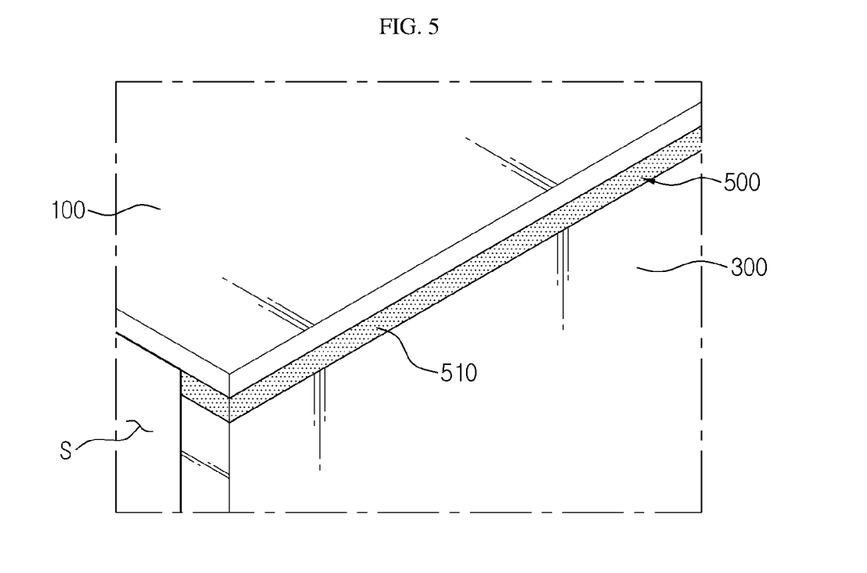
FIG. 5 is an enlarged view showing a portion A of FIG. 4.

FIG. 1 is a perspective view schematically showing a battery module housing according to an embodiment of the present disclosure and battery cells accommodated therein, FIG. 2 is an exploded perspective view showing that a top plate is detached from the battery module housing of FIG. 1, FIG. 3 is a schematic cross-sectioned view, taken along the line I-I' of FIG. 1, FIG. 4 is a perspective view showing the battery module housing according to an embodiment of the present disclosure, and FIG. 5 is an enlarged view showing a portion A of FIG. 4.

A battery module housing 10 of the present disclosure described below may be understood as a component such as a case for accommodating the battery cells 20. Here, the battery cells 20 may be pouch-type secondary batteries. The pouch-type secondary batteries may be stacked horizontally or arranged in multiple layers, and then accommodated in the inner space S of the battery module housing 10. Although not shown in detail, other components such as a stacking frame for guiding the battery cells 20 to be stacked, a thermistor, and the like may be accommodated together in addition to the battery cells 20.

Referring to FIGS. 1 to 4, the battery module housing 10 according to the present disclosure may be provided in a rectangular tube shape and include a top plate 100 and a bottom plate 200 forming an upper wall and a lower wall, and a first side plate 300 and a second side plate 400 forming both side walls.

The battery module housing 10 may provide a mechanical support for the battery cells 20 and protect the battery cells 20 from external impacts. Thus, the four plates of the battery module housing 10 are preferably made of a metal material to secure rigidity.

Though not shown, an interconnection board (ICB) assembly for connecting the battery cells 20 in series and/or in parallel may be coupled to the front surface and the rear surface of the battery module housing 10. The ICB assembly may include a plurality of bus bars and an ICB housing capable of covering the front surface and the rear surface of the battery module housing 10. For reference, as shown in FIG. 1, the electrode leads 21 of the battery cells 20 exposed on the front surface and the rear surface of the battery module housing 10 may be welded to the bus bars to be electrically connected and covered with the ICB housing, respectively.

The first side plate 300 and the second side plate 400 of the battery module housing 10 may have the same thickness and the same shape, and the top plate 100 and the bottom plate 200 may also have the same thickness and the same shape. At this time, the thickness of the first side plate 300 and the second side plate 400 may be relatively thicker than the thickness of the top plate 100 and the bottom plate 200 for the robustness of the battery module housing 10.

In particular, the battery module housing 10 according to the present disclosure may be manufactured in an adhesive manner so that the four plates 100, 200, 300, 400 may be partially disassembled, unlike the conventional welding method.

Specifically, as shown in FIGS. 3 to 5, the battery module housing 10 according to the present disclosure has bonding portions 500 at four spots. The bonding portions 500 may be formed as the adhesive 510 is applied along the longitudinal direction (the X-axis direction) at four spots corresponding to spots between both side edges of the top plate 100 opposite to each other and the top surfaces of the first side plate 300 and the second side plate 400 and spots between both side edges of the bottom plate 200 opposite to each other and the bottom surfaces of the first side plate 300 and the second side plate 400.

The disassembling operation of the battery module housing 10 will be described briefly. Generally, the bonding strength of the adhesive 510 may be lowered to about 70 to 85% compared the ordinary state under normal temperature and humidity conditions. Thus, the disassembling work of the battery module housing 10 is performed in a state where the bonding performance is sufficiently low after the pretreatment process such as storing the battery module in a hot and humid space for a predetermined time or locally applying heat and/or moisture around the bonding portion 500.

Meanwhile, the battery module housing 10 according to the present disclosure may further include an insulation pad 600 for preventing the heat from being transmitted to the battery cells 20 when heat is locally applied around the bonding portion 500 to weaken the performance of the adhesive 510 of the corresponding bonding portion 500.

For example, as shown in FIG. 3, the insulation pad 600 may be attached to the inner surface of each of the top plate 100, the first side plate 300 and the second side plate 400. According to this configuration, even if heat is applied to the top plate 100, the first side plate 300 and the second side plate 400 during the pretreatment process for disassembling the battery module housing 10, the battery cells 20 may be protected from external heat.

In addition, a thermal transfer pad 700 may be attached to the bottom plate 200. As shown in FIG. 3, even if heat is applied to the upper portion of the battery module housing 10 and transferred to the battery cells 20, the temperature of the battery cells 20 may be properly maintained by discharging the heat to the bottom plate 200 through the thermal transfer pad 700. At this time, if a heatsink (not shown) is additionally connected to the bottom portion of the bottom plate 200, the heat of the battery cells 20 may be more actively removed.

The thermal transfer pad 700 may be made of any material having a property capable of promoting thermal conductivity and eliminating an air layer between the bottom portion of the battery cells 20 and the bottom plate 200. Alternatively, the thermal transfer pad 700 may be replaced by a thermal interface material (TIM) such as thermal grease.

Meanwhile, two objects adhered to each other has a relatively high shear strength, compared to the peel strength. Thus, when separating two objects, it is effective to apply a force in a direction perpendicular to the bonding surface.

For this reason, for the disassembling work of the battery module housing 10, a detachable jig 30 may be placed on the front surface and the rear surface of the top plate 100 or the bottom plate 200, and then a force may be applied in a vertical direction to detach the top plate 100 or the bottom plate 200 from the other plates 300, 400.

However, the above method is available only after the ICB assembly is disassembled from the battery module housing 10. However, as described above, the ICB assembly covers the front surface and the rear surface of the battery module housing 10 in a state of being welded to the electrode leads 21 of the battery cells 20, it may not be easy to remove the ICB assembly first.

The battery module housing 10 according to the second embodiment and the third embodiment of the present disclosure is configured such that the detachable jig 30 is used at the side surface of the battery module housing 10, if the detachable jig 30 is not useable at the front surface and the rear surface of the top plate 100 or the bottom plate 200 due to the ICB assembly (not shown).

Figure 6:
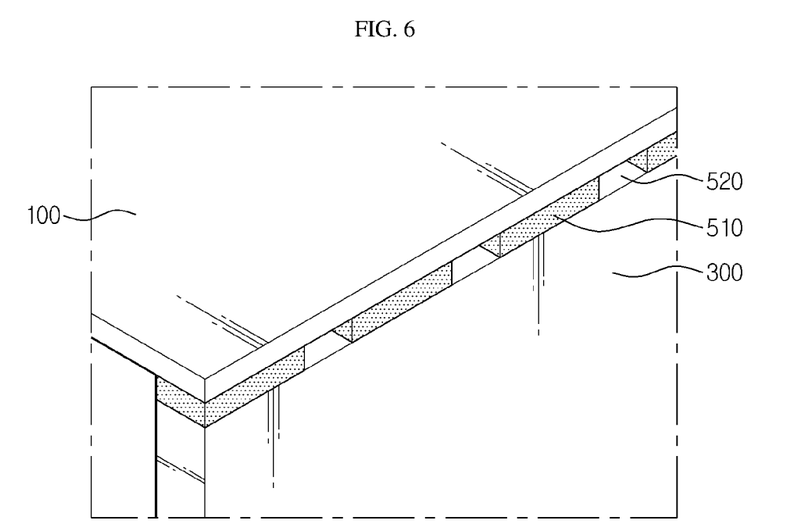
FIGS. 6 and 7 are diagrams corresponding to FIG. 5, which show the second embodiment and the third embodiment of the present disclosure.
Figure 7:
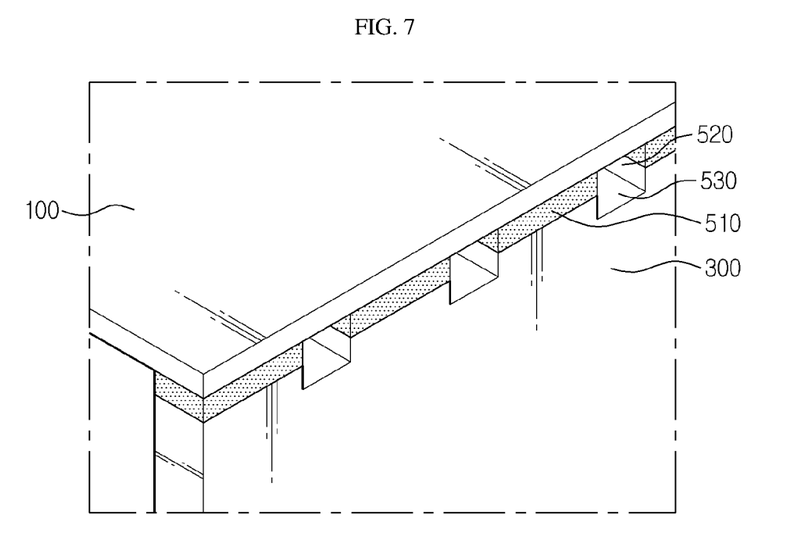
Figure 8:
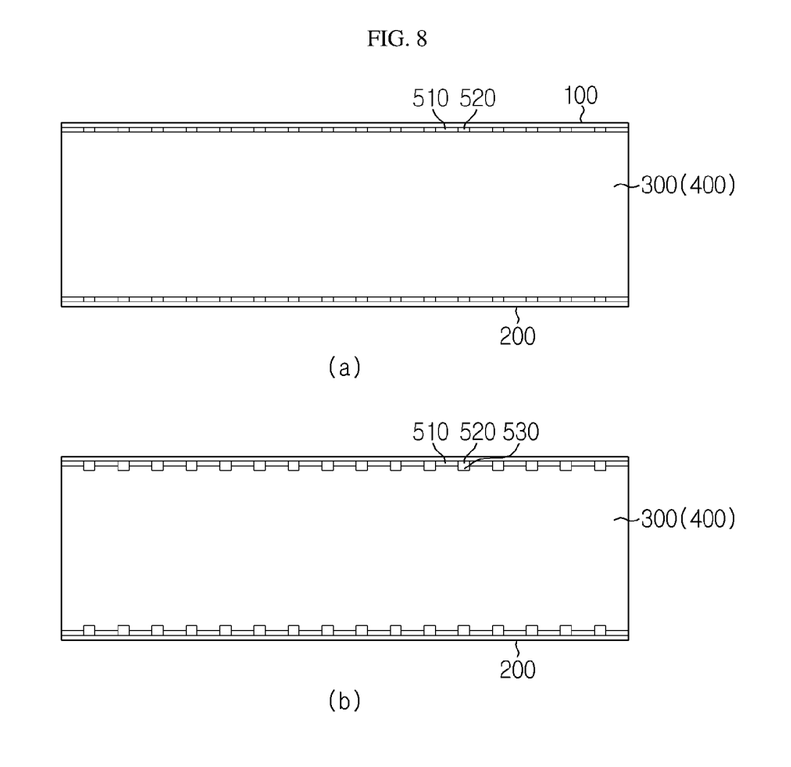
FIGS. 8(a) and 8(b) are side views respectively showing battery module housings according to the second embodiment and the third embodiment of the present disclosure.
Figure 9:
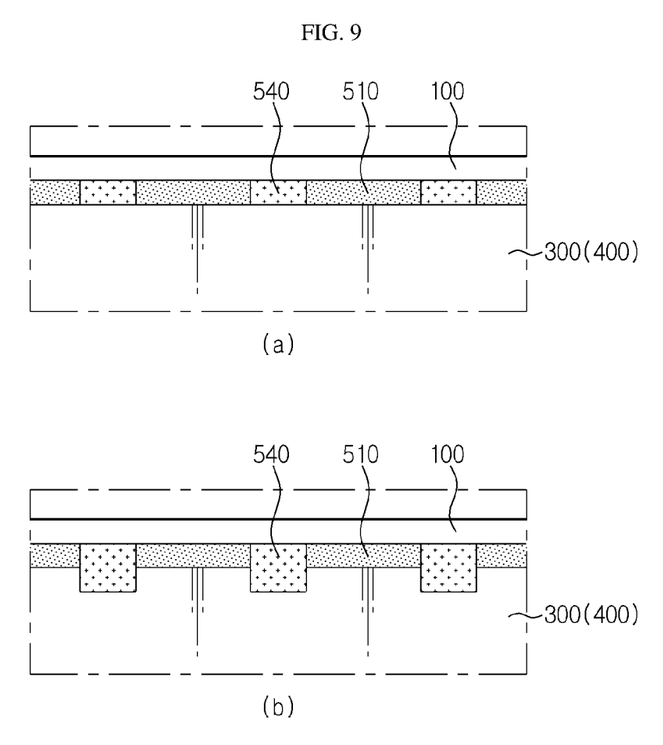
FIGS. 9(a) and 9(b) are partially enlarged views respectively showing a portion (a) and a portion (b) of FIG. 8.
Figure 10:
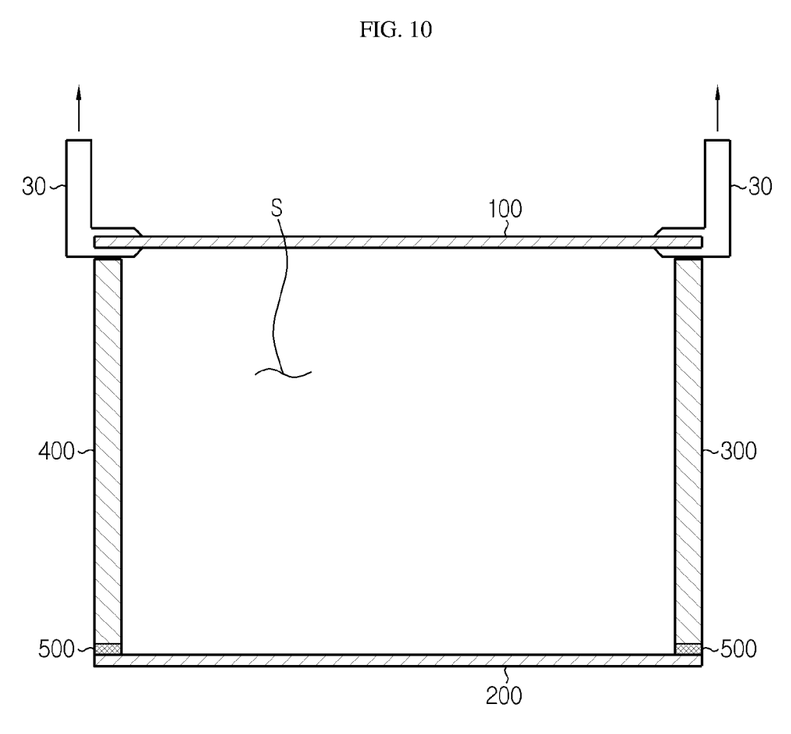
FIG. 10 is a reference view for illustrating a method of disassembling the battery module housings according to the second embodiment and the third embodiment of the present disclosure.

FIGS. 6 and 7 are diagrams corresponding to FIG. 5, which show the second embodiment and the third embodiment of the present disclosure, FIGS. 8(a), 8(b), 9(a) and 9(b) are side views and enlarged views thereof respectively showing battery module housings 10 according to the second embodiment and the third embodiment of the present disclosure, and FIG. 10 is a reference view for illustrating a method of disassembling the battery module housings 10 according to the second embodiment and the third embodiment of the present disclosure.

First, referring to FIGS. 6 to 10, common features of the battery module housings 10 according to the second embodiment and the third embodiment of the present disclosure will be explained. The bonding portion 500 according to the second embodiment and the third embodiment of the present disclosure may have a region where the adhesive 510 is not applied at a predetermined location. The region where the adhesive 510 is not applied may be used as a detachable jig insertion space 520 in which the detachable jig 30 may be partially inserted. The detachable jig insertion space 520 may be provided in plural, and the plurality of detachable jig insertion spaces 520 may be intermittently formed along the longitudinal direction of the first side plate 300 and the second side plate 400.

In these embodiments, the detachable jig insertion space 520 is formed at both the top end and the bottom end of the battery module housing 10. However, it is also possible that the detachable jig insertion space 520 is formed only between the top plate 100 and the first and second side plates 300, 400, namely only at a top end of the module housing 10. In general, internal components of the battery module may be replaced or repaired if the top plate 100 is detached from the battery module housing 10. Thus, it may be desirable to reduce the number of detachable jig insertion spaces 520 by eliminating unnecessary detachable jig insertion spaces.

The detachable jig insertion space 520 may be filled with a caulking member 540 made of a soft material. Here, the caulking member 540 may be, for example, any one of a sealant, a urethane foam and a rubber material in the form of a flexible foam. However, the caulking member 540 of the present disclosure should not be limited to the exemplified substance. In other words, any material may be used as long as it has a soft property and airtightness.

Specifically, as shown in FIG. 9, the detachable jig insertion spaces 520 of the battery module housing 10 may be closed with the caulking member 540. Thus, at ordinary time, the battery module housing 10 may be kept airtight so that moisture or other foreign matter may not flow in through the side portion. If necessary, the caulking member 540 may be removed and the detachable jig 30 can may mounted thereto.

According to the configurations of the second embodiment and the third embodiment, as shown in FIG. 10, the detachable jig 30 may be mounted to both side surfaces of the battery module housing 10, namely to the detachable jig insertion spaces 520, to apply a load to the bonding portion 500 in the vertical direction. At this time, if it is intended to detach the top plate 100 at once by applying a force at a specific position, the top plate 100 may be plastic-deformed or broken due to the adhesive force of the other regions.

Thus, it is desired to apply a load in the vertical direction while moving the detachable jig 30 sequentially along the longitudinal direction of the side plate, so that the top plate 100 is detached from the top surfaces of the first side plate 300 and the second side plate 400 in a state where the bonding performance of the adhesive 510 is uniformly weakened.

Meanwhile, in the third embodiment, the detachable jig insertion space 520 may be extended more widely, compared to the second embodiment. That is, at least one of the first side plate 300 and the second side plate 400 according to the third embodiment of the present disclosure may further have a space expansion portion 530, which is prepared by concavely forming a region to the detachable jig insertion space 520 to have an uneven structure.

Specifically, referring to FIGS. 7 and 8(b), the first side plate 300 and the second side plate 400 may be designed such that the uneven structure is repeated along the longitudinal direction of the top surface and the bottom plate. Here, the concave region may be defined as the space expansion portion 530, and the space expansion portion 530 may be utilized as the detachable jig insertion space 520 since the adhesive 510 is not applied thereto. Thus, the detachable jig insertion space 520 according to the third embodiment may have a larger width than the detachable jig insertion space 520 according to the second embodiment. With this configuration, the detachable jig 30 may be inserted into the detachable jig insertion space 520 more easily, compared with the second embodiment. Also, the detachable jig 30 may have a greater thickness than the second embodiment described above, which allows a greater load to be applied to the bonding portion 500.

Subsequently, the fourth embodiment of the present disclosure will be described with reference to FIGS. 11 to 14. The features identical to the former embodiments will not described in detail, and features different from the former embodiments will be described in detail.

In this embodiment, the bonding portion 500' of at least one of the four sites among the bonding portions 500 may be inclined at a predetermined angle toward the inner space S of the battery module housing 10, as compared to the former embodiments.

Figure 11:
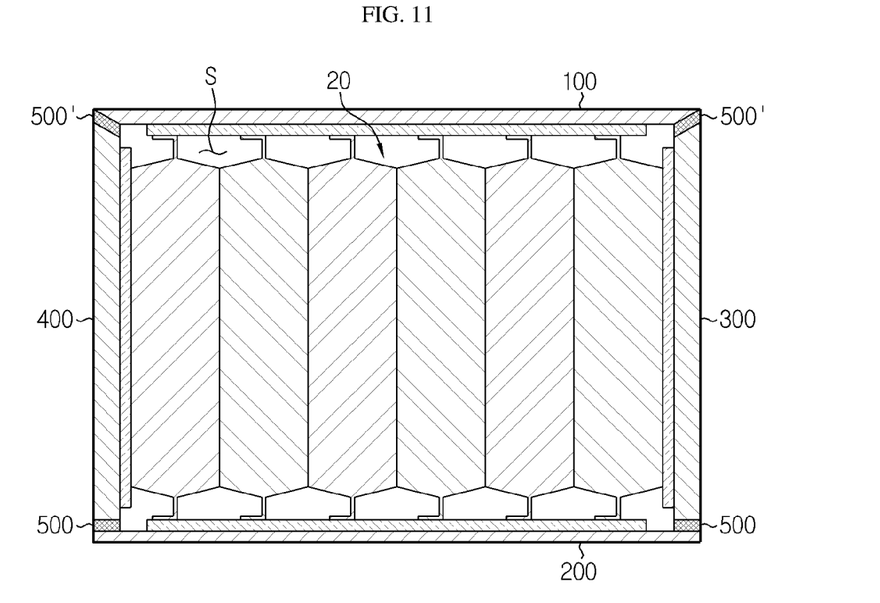
FIG. 11 is a cross-sectioned view showing the fourth embodiment of the present disclosure, which corresponds to FIG. 3.

For example, as shown in FIG. 11, the battery module housing 10 according to the fourth embodiment may be fabricated in such a way that both side edges of the top plate 100 opposite to each other and the top surfaces of the first side plate 300 and the second side plate 400 are cut at predetermined angles, and the bonding portion 500' may be formed thereon by applying the adhesive 510 to have a predetermined angle θ with respect to the horizontal plane.

Figure 12:
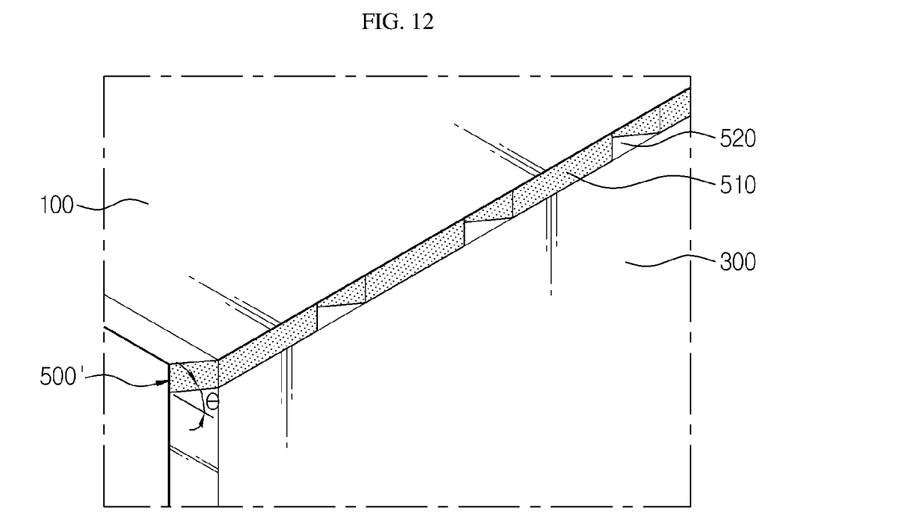
FIG. 12 is a partially enlarged view showing the fourth embodiment of the present disclosure, which corresponds to FIG. 5.

As shown in FIG. 12, even in the fourth embodiment, the detachable jig insertion spaces 520 may be intermittently provided along the longitudinal direction of the first side plate 300 and the second side plate 400. Here, it is possible to add the space expansion portion 530 by applying an uneven structure to the first side plate 300 and the second side plate 400 as in the third embodiment. Also, the detachable jig insertion space 520 may be closed with the caulking member 540, as in the former embodiments.

The disassembling operation of the battery module housing 10 according to the fourth embodiment will be briefly described. First, the bonding portion 500' at an upper portion of the battery module housing 10 is locally heated to lower the bonding performance of the corresponding region to about 70 to 85%. Then, the caulking member 540 is pushed into the inner space S of the battery module housing 10 or cut it out.

Figure 13:
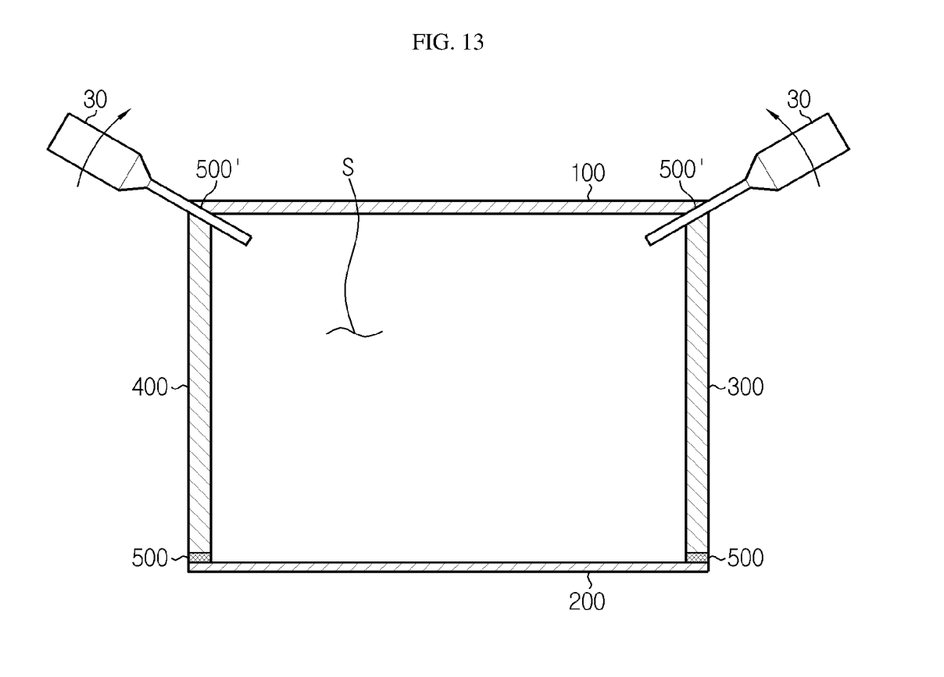
FIG. 13 is a reference view for illustrating a method of disassembling the battery module housings according to the fourth embodiment of the present disclosure.

Then, as shown in FIG. 13, the detachable jig 30 is inserted into the detachable jig insertion space 520. At this time, the detachable jig 30 may use any element as long as it may be inserted into the detachable jig insertion space 520. Thus, more various elements may be selected as the detachable jig 30, compared to the former embodiments.

In particular, according to this embodiment, since the detachable jig 30 may be inserted diagonally into the bonding portion 500' at the upper portion of the battery module housing 10, the top plate 100 may be detached from the first side plate 300 and the second side plate 400 more easily with a small force, compared to the former embodiments.

Subsequently, a battery module housing 10 according to the fifth embodiment of the present disclosure will be briefly described with reference to FIG. 14.

The battery module housing 10 according to the fifth embodiment may include a bent portion 110, which is formed to be bent from both edges of at least one of the top plate 100 and the bottom plate 200 and disposed in contact with the outer side surfaces of the first side plate 300 and the second side plate 400, compared to the former embodiments.

Figure 14:
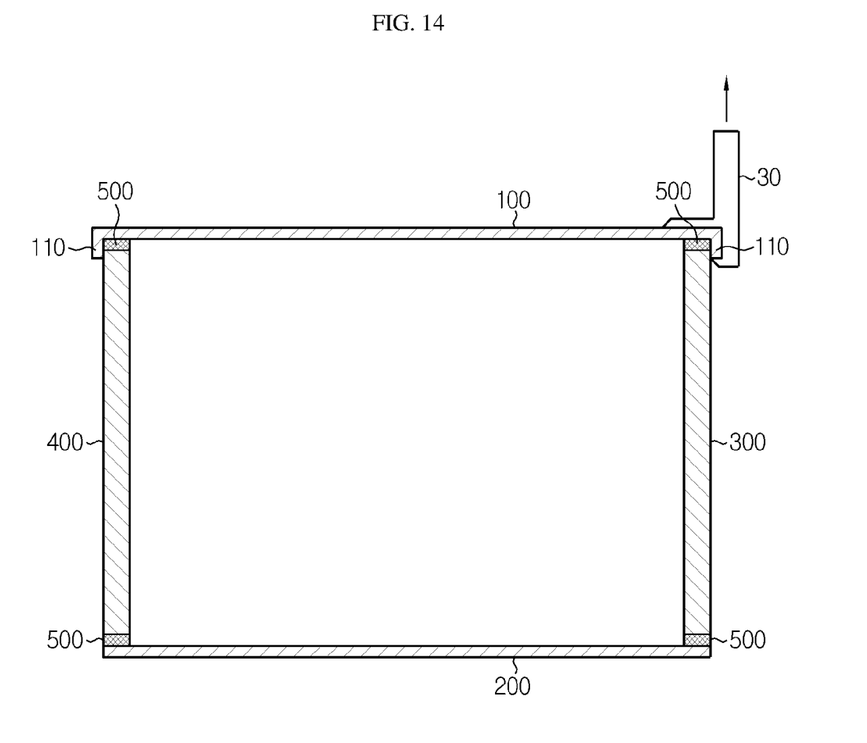
FIG. 14 is a reference view for illustrating a method of disassembling the battery module housings according to the fifth embodiment of the present disclosure.

For example, as shown in FIG. 14, the top plate 100 according to this embodiment may be provided to surround the top surfaces and the outer side surfaces of the first side plate 300 and the second side plate 400. The bent portion 110 of the top plate 100 may protect the bonding portion 500 not to be exposed to the outside and may also be used as a place where the detachable jig 30 may be mounted during the disassembling operation.

In particular, the detachable jig insertion space 520 is not present at the bonding portion 500 of the battery module housing 10 according to the fifth embodiment. That is, the battery module housing 10 according to the fifth embodiment has the bonding portion 500 where the adhesive 510 is successively applied, between the four plates 100, 200, 300, 400, as in the first embodiment.

In this configuration, the airtightness is superior at ordinary time, compared to the former embodiments, and if necessary, the top plate 100 may be detached by using the detachable jig 30 at the side surface of the battery module housing 10.

Meanwhile, a battery module according to the present disclosure may include the battery module housing 10 of the present disclosure. Also, in addition to the battery module housing 10, the battery module according to the present disclosure further includes battery cells 20 accommodated in the battery module housing 10, an ICB assembly for electrically connecting the battery cells 20 and sensing voltage characteristics of the battery cells 20, and various devices for controlling charge and discharge of the battery cells such as a BMS, a current sensor and a fuse.

The battery module may be applied to a vehicle such as an electric vehicle and a hybrid electric vehicle or a power storage system (ESS).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, when the terms indicating up, down, left, right, front and rear directions are used in the specification, it is obvious to those skilled in the art that these merely represent relative locations for convenience in explanation and may vary based on a location of an observer or an object to be observed.

What is claimed is:

1. A battery module housing comprising:
   a top plate and a bottom plate forming an upper wall and
   a lower wall, respectively, and a first side plate and a second side plate forming side walls, respectively, the battery module housing having a rectangular tube shape provided to accommodate battery cells in an inner space thereof, wherein the battery module housing has four bonding portions each including an adhesive along a longitudinal direction, the bonding portions located at two sites between opposing side edges of the top plate and top surfaces of the first side plate and second side plate, respectively, and at two sites between opposing side edges of the bottom plate and bottom surfaces of the first side plate and second side plate, respectively, wherein at least one of the bonding portions has locations along the longitudinal direction at which the adhesive is not applied to define a plurality of detachable jig insertion spaces, respectively, and the plurality of detachable jig insertion spaces are intermittently formed along the longitudinal direction of the first side plate or the second side plate, wherein at least one of the first side plate and the second side plate defines a plurality of concave regions respectively corresponding to the plurality of detachable jig insertion spaces, such that a detachable jig can be inserted into the detachable jig insertion spaces and the corresponding concave regions to apply a load to the bonding portion to detach the joined plates, and wherein the opposing side edges of the top plate and the top surfaces of the first side plate and the second side plate are cut to be inclined downward with respect to a horizontal surface at predetermined angles toward an inside of the battery module housing, so that at least one of the bonding portions provided at an upper portion of the battery module housing is provided to be inclined, and the detachable jig insertion spaces are provided so that the detachable jig is diagonally inserted toward the inner space of the battery module housing.

2. The battery module housing according to claim 1, further comprising:
   insulation pads respectively attached to inner surfaces of the top plate, the first side plate and the second side plate; and
   a thermal transfer pad attached to an inner surface of the bottom plate.

3. A battery module, comprising a battery module housing defined in claim 1 and one or more battery cells.

4. The battery module housing according to claim 1, further comprising a caulking member entirely filled in each of the plurality of detachable jig insertion spaces and each of the plurality of concave regions to close the plurality of detachable jig insertion spaces and the plurality of concave regions.

5. The battery module housing according to claim 4, wherein the caulking member is a sealant, a urethane foam, or a rubber material in the form of a flexible foam.

* * * * *